United States Patent

Takada et al.

[11] Patent Number: 5,295,173
[45] Date of Patent: Mar. 15, 1994

[54] FREQUENCY DIVIDER FOR DIVIDING TWO INPUT PULSES

[75] Inventors: Kazuyuki Takada, Hirakata; Yoshihiro Matsui, Moriguchi, both of Japan

[73] Assignee: Matsushita Electric Industrial Co., Ltd., Kadoma, Japan

[21] Appl. No.: 925,786

[22] Filed: Aug. 7, 1992

[30] Foreign Application Priority Data

Nov. 1, 1991 [JP] Japan .................. 3-287526

[51] Int. Cl.[5] .......................................... H03K 23/66
[52] U.S. Cl. ........................................ 377/47; 377/48; 377/52; 377/110
[58] Field of Search ............... 377/47, 48, 52, 110

[56] References Cited

U.S. PATENT DOCUMENTS 5,222,110 6/1993 Holzinger et al. .................. 377/47

OTHER PUBLICATIONS

Yojiro Yokoi, Digital Circuit Manual, Apr. 1983, pp. 91-97.

Primary Examiner—Margaret R. Wambach
Attorney, Agent, or Firm—Cushman, Darby & Cushman

[57] ABSTRACT

A dividing ratio is represented by a ratio (M/N) of two integers (M) and (N), and six data (N), (−N), (M), (M+N), (M−N) and (0) are generated, then one of the six data is selected on the basis of a condition that is predetermined by an input signal to be divided and a comparison result of the data (N), (−N) and data which is derived by addition or subtraction between the selected data from the six data and the previous calculation result of the addition or subtraction; and output or interception of an output signal is controlled on the basis the comparison result, and thereby the input signal is divided by the dividing ratio (M/N).

2 Claims, 4 Drawing Sheets

FREQUENCY DIVIDER FOR DIVIDING TWO INPUT PULSES

FIELD OF THE INVENTION AND RELATED ART STATEMENT

1. Field of the Invention

The present invention relates generally to a frequency divider, and more particularly to a frequency divider for dividing pulse signals of two lines which are output from respective output terminals corresponding to rotating directions of a rotary encoder for use in a numerical control machine or the like.

2. Description of the Related Art

A position sensor which is used in a numeral control machine or an industrial robot, a rotary encoder for example, outputs a pulse signal of a maximum frequency of about 10 MHz. In case that the output pulse signal of the rotary encoder is divided, a time-lag in the dividing operation of the frequency divider must be minimized.

There is a known frequency divider having complicated configuration using a computer. Such frequency divider, however, requires a relatively long time for performing the dividing operation, and it can not provide a divided output signal having a short time-lag.

An example of a conventional frequency divider having a relatively short time-lag is elucidated hereafter.

A rotary encoder is mounted on a shaft of a servo motor for example, and a pulse signal is output at every rotational angles of the shaft, which angles being corresponding to a resolution of the rotary encoder. In general, in the rotary encoder, the rotating direction of the shaft is distinguishable, and the pulse signal is output from either one of two output terminals depending on the rotating direction of the shaft. A rotating direction is defined to a "normal rotation", and the pulse signal output in the normal rotation is called an "UP-pulse signal". On the contrary, the reverse rotating direction is defined to a "reverse rotation", and the pulse signal output in the reverse rotation is called a "DOWN-pulse signal". The UP-pulse signal and DOWN-pulse signal are divided into a ratio required for a pulse operation unit included in a control apparatus of the numerical control machine, for example.

Figure 4:
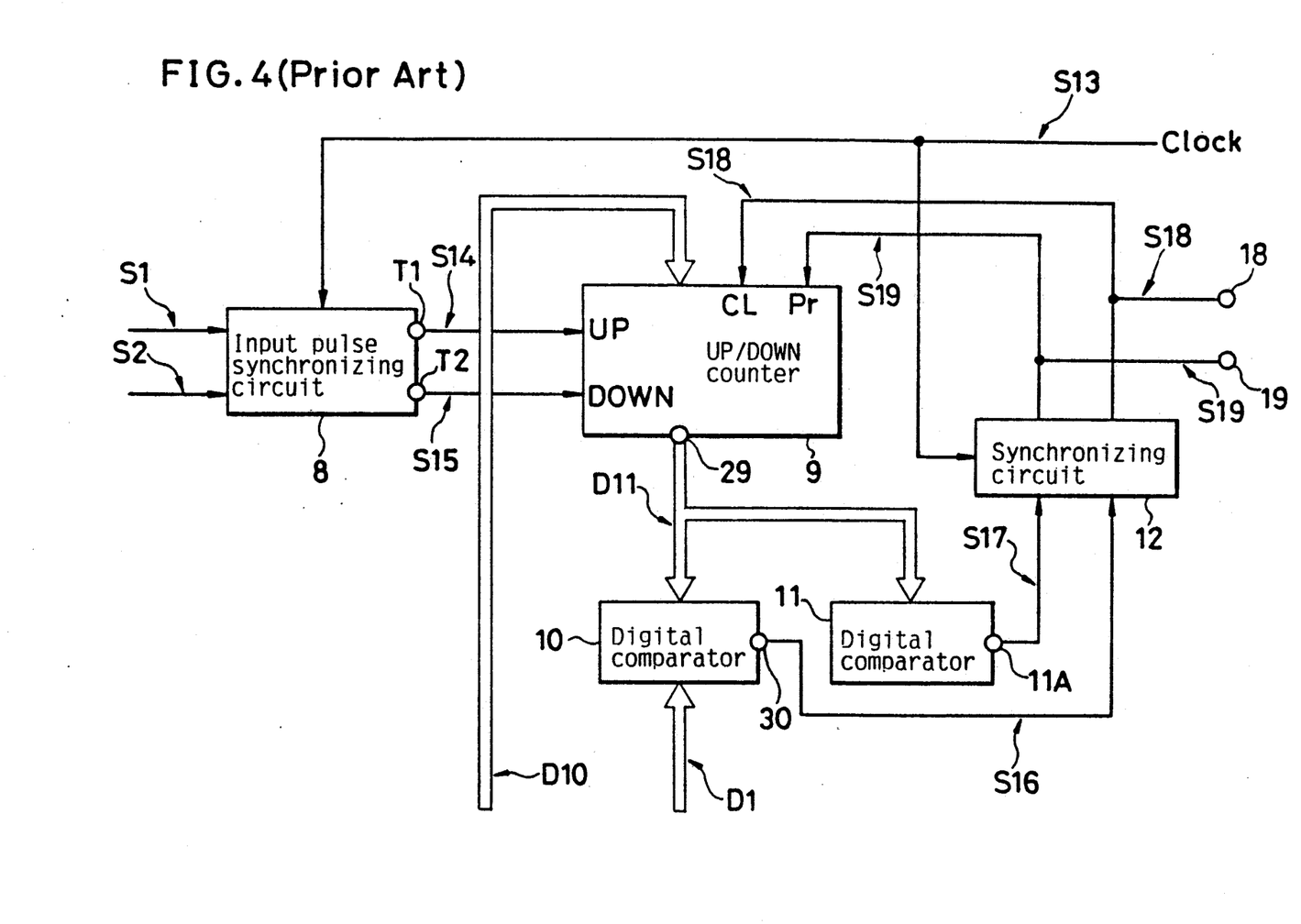
FIG. 4 is the block diagram of the frequency divider in the prior art.

FIG. 4 is the block diagram of an example of a frequency divider in the prior art. Referring to FIG. 4, the UP-pulse signal S1 and DOWN-pulse signal S2 are inputted to an input pulse synchronizing circuit 8, and a clock signal S13 having a constant period is applied thereto. The frequency of the clock signal S13 is selected as a sufficiently higher frequency with respect to the maximum frequency of the UP-pulse signal S1 or the DOWN-pulse signal S2.

The input pulse synchronizing circuit 8 includes two registers (not shown in FIG. 4) for storing the UP-pulse signal S1 and DOWN-pulse signal S2, and the inputted UP-pulse signal S1 and DOWN-pulse signal are stored in the respective registers. The UP-pulse signal S1 or the DOWN-pulse signal S2 in each register is output to an output terminal T1 or T2 in synchronism with the clock signal S13 as a COUNT-UP pulse signal S14 or a COUNT-DOWN pulse signal S15, respectively.

The COUNT-UP pulse signal S14 is inputted to a COUNT-UP input terminal UP of an UP/DOWN counter 9, and a COUNT-DOWN pulse signal S15 is inputted to a COUNT-DOWN input terminal DOWN thereof.

The UP/DOWN counter 9 performs COUNT-UP operation for accumulatively adding the number of the input pulse by input of the COUNT-UP pulse signal S14, and also performs COUNT-DOWN operation for accumulatively subtracting the input pulse from the present count value by input of the COUNT-DOWN pulse signal S15. The counted value of the UP/DOWN counter 9 is output from an output terminal 29 as a count data D11 of a digital value. The count data D11 is applied to a digital comparator 10.

A dividing ratio data D1 representing a predetermined integer for setting a dividing ratio of the frequency divider is applied to the digital comparator 10, and the count data D11 is compared with the dividing ratio data D1 in the digital comparator 10. When both the data D1 and D11 are in coincidence to each other, a coincidence signal S16 is output to an output terminal 30.

The count data D11 of the UP/DOWN counter 9 is inputted to another digital comparator 11. In the digital comparator 11, when the count data D11 becomes a value "−1" and below, a comparison output signal S17 is output to an output terminal 11A.

The coincidence signal S16 and comparison output signal S17 are inputted to a synchronizing circuit 12. The synchronizing circuit 12 comprises two registers (not shown) for storing the coincidence signal S16 and comparison output signal S17 and stores them, and the input of the coincidence signal S16 or the comparison output signal S17 is detected at the timing of the clock signal S13. When the coincidence signal S16 or the comparison output signal S17 is inputted, a clear signal S18 or a preset signal S19 which is elucidated hereinafter is output in synchronism with the clock signal S13, respectively. The clear signal S18 or the preset signal S19 is applied to the UP/DOWN counter 9 and clears the counted data or presets for a new counting operation, respectively.

For example, when the UP-pulse signal S1 is inputted, the UP/DOWN counter 9 performs COUNT-UP operation of the COUNT-UP pulse signal S14. Then the count data D11 is coincident with the dividing ratio data D1 in the digital comparator 10, the coincidence signal S16 is output from the digital comparator 10 and is applied to the synchronizing circuit 12. When the coincidence signal S16 is inputted to the synchronizing circuit 12, the clear signal S18 is output therefrom and is applied to a clear terminal CL of the UP/DOWN counter 9. Consequently, the counted value of the UP/DOWN counter 9 is made to zero. As mentioned above, the counting operation in the UP/DOWN counter 9 is repeated from numeral 1 to the integer of the dividing ratio data D1, and a divided signal is obtained as the coincidence signal S16. The coincidence signal S16 is applied to the synchronizing circuit 12, and is stored temporarily in the register. Then the stored coincidence signal S16 is output in synchronism with the clock signal S13 for the clear signal S18. Namely, the clear signal S18 is the divided signal of the UP-pulse signal S1 which synchronizes with the clock signal S13 and is output to a terminal 18.

In case that the DOWN-pulse signal S2 is inputted, the COUNT/DOWN-pulse signal S15 is inputted to a terminal "DOWN" of the UP/DOWN-counter 9, and COUNT-DOWN operation is carried out. When the count data D11 of the UP/DOWN-counter 9 becomes "−1" or below, namely a negative value, the digital comparator 11 detects the negative value of the count data D11, and outputs a comparison output signal S17 to the synchronizing circuit 12. Consequently, the present signal S19 is output from the synchronizing circuit 12 and is applied to a preset terminal Pr of the UP-/DOWN-counter 9. Thereby a predetermined preset data D10 is set in the UP/DOWN-counter 9. The value of the preset data D10 is an integer which is smaller by one than the value of the dividing ratio data D1. In the above-mentioned operation, when the dividing ratio is "N", the counted value of the UP/DOWN-counter 9 is changed as (N−1), . . . , 2, 1, 0, (N−1), . . . .

The above-mentioned counting operation is repeated, and the divided signal of the DOWN-pulse signal is output as the comparison output signal S17. In a similar manner to the afore-mentioned COUNT-UP operation, the preset signal S19 is also output in synchronism with the clock signal S13 and is output to the terminal 19.

In the above-mentioned conventional frequency divider, the dividing ratio is given by an inverse value of an integer. Namely, when an integer is N, the dividing ratio is represented by 1/N.

OBJECT AND SUMMARY OF THE INVENTION

An object of the present invention is to provide a frequency divider in which a dividing ratio is set by a ratio of arbitrary two integers and dividing operation having a short time-lag is realizable.

The frequency divider in accordance with the present invention comprises:

clock signal generating means for generating a clock pulse signal of a predetermined period, a pulse input circuit comprising memory means for storing an input pulse signal and a first logic circuit for generating a predetermined digital data based on the input pulse signal, and outputting respective digital data corresponding to presence or absence of the input pulse signal in synchronism with the clock pulse signal, an input apparatus for setting numerator data (M) and denominator data (N) for designating a dividing ratio (M/N), a dividing ratio setting apparatus for generating respective digital data representing the numerator data (M), the denominator data (N), negative denominator data (−N), data of sum of the numerator data (M) and denominator data (N), data of difference subtracted the denominator data (N) from the numerator data (M) and data of zero on the basis of the denominator data (N) and the numerator data (M) inputted from the input apparatus, memory means for storing output data of a calculation circuit, and outputting the stored data in synchronism with the clock signal, a digital comparator for comparing output data of the memory means, the denominator data (N) and the negative denominator data (−N), and for outputting comparison resultant data corresponding to one of a predetermined number of comparison conditions, a second logic circuit for outputting:
  selection data for selecting one data from among the digital data generated by the dividing ratio setting apparatus,
  calculation instruction data for instructing either one of addition operation, subtraction operation and addition-or-subtraction operation, and
  output instruction data for instructing output or interception of an output signal corresponding to the input pulse signal, and the selection data, calculation instruction data and output instruction data are predetermined in correspondence to combinations of the digital data representing presence or absence of the input pulse signal and the comparison resultant data, a data selector for selecting one digital data designated by the selection data given from the second logic circuit from among the digital data inputted from the dividing ratio setting apparatus, a calculation circuit for applying calculation based on the calculation instruction data inputted from the second logic circuit to the digital data output from the data selector and output data of the memory means for storing the output data, and inputting resultant output data to the memory means, and a pulse output circuit for outputting an output pulse signal in compliance with the output instruction data output from the second logic circuit.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
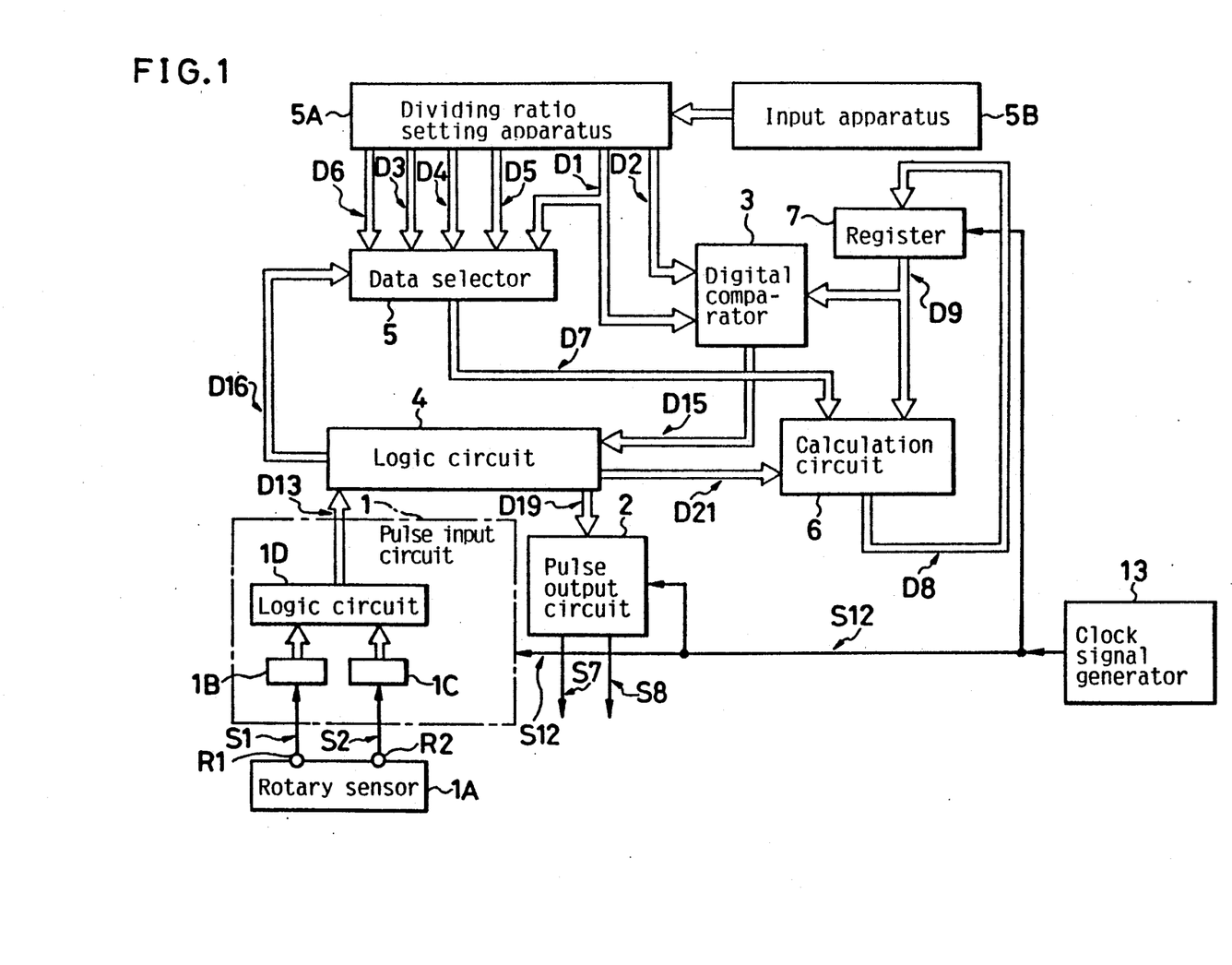
FIG. 1 is a block diagram of an embodiment of a frequency divider in accordance with the present invention.
Figure 2:
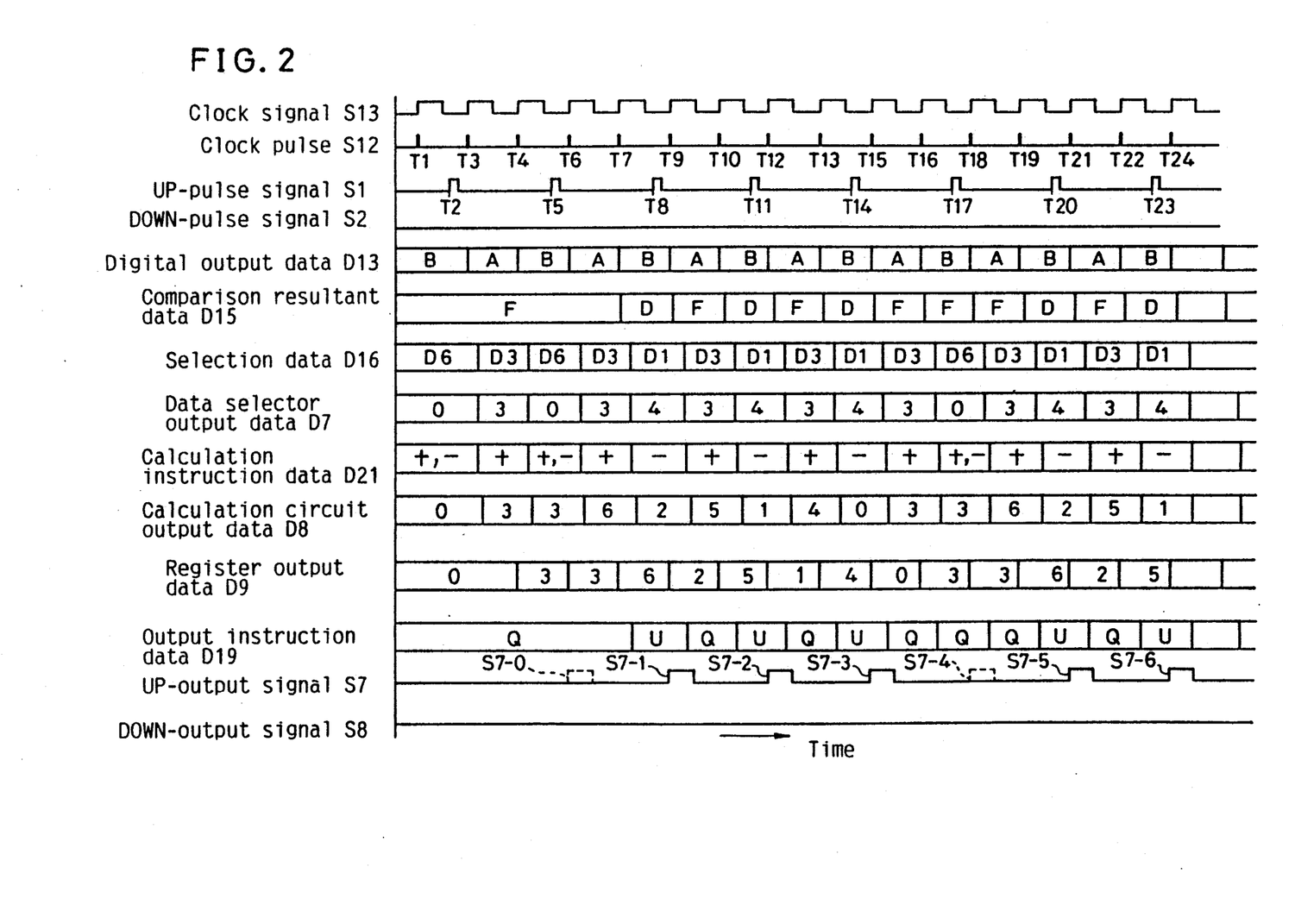
FIG. 2 is a timing chart of dividing operation in the case that UP-pulse signals are inputted to the frequency divider of the embodiment.

FIG. 1 is a block diagram of a frequency divider of an embodiment in accordance with the present invention. Referring to FIG. 1, a pulse input circuit 1 comprises registers 1B and 1C for temporarily storing respective input signals and a logic circuit 1D for applying a logical operation to the input signals. For a rotary sensor 1A, a known rotary encoder, for example is used. A clock signal S13 shown in FIG. 2 is generated by the clock signal generator 13. A clock pulse S12 which is a rise edge pulse signal of the clock signal S13 is output therefrom. In general, the frequency of the clock signal S13 is sufficiently higher than the maximum frequency of output signals of the rotary sensor 1A.

A rotating direction of the rotary sensor 1A is defined as "a normal rotation", and a pulse signal which is output in the normal rotation is called an "UP-pulse signal S1". On the other hand, the output in the "reverse rotation" of the rotary sensor 1A is called a "DOWN-pulse signal S2". The UP-pulse signal S1 or the DOWN-pulse signal S2 is output to an output terminal R1 or an output terminal R2 of the rotary sensor 1A, respectively, and is inputted to the pulse input circuit 1. The UP-pulse signal S1 or the DOWN-pulse signal S2 is stored in the register 1B or 1C in the pulse input circuit 1, respectively, and is applied to the logic circuit 1D in synchronism with the clock pulse S12. In the logic circuit 1D, the UP-pulse signal S1 and DOWN-pulse signal S2 are converted to digital data and are output as digital output data D13.

In the pulse input circuit 1, the UP-pulse signal S1 and DOWN-pulse signal S2 are converted into two bit digital data, for example. With respect to the digital output data D13, when the UP-pulse signal S1 is inputted a signal representing digital data "A" is output, and when the DOWN-pulse signal S2 is inputted, a signal representing digital data "C" is output, for example. When both the UP-pulse signal S1 and DOWN-pulse signal S2 are not inputted, a signal representing digital data "B" is output.

Figure 3:
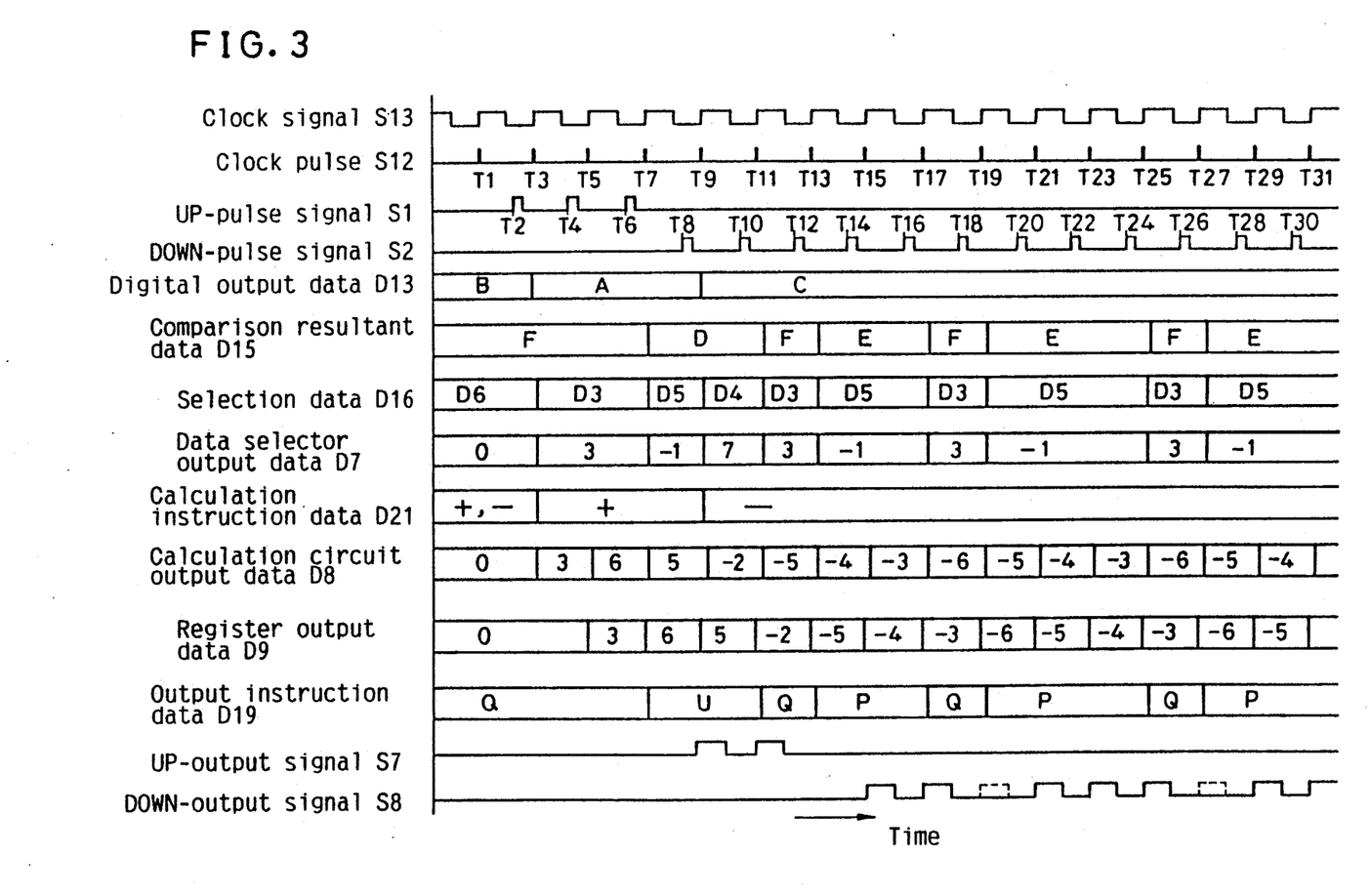
FIG. 3 is a timing chart of dividing operation in the case that DOWN-pulse signals are inputted to the frequency divider of the present invention.

The digital output data D13 maintains the same data during one period of the clock pulse S12. The abovementioned state is illustrated by a diagram of the digital output data D13 in the timing chart of FIG. 2. In the diagram, a box including letter "A" illustrates a period of output of the digital data A, and a box including letter "B" illustrates a period of output of the digital data B. Still more, when a DOWN-pulse signal S2 is inputted, a digital data C is output for the digital output data D13; but in the diagram shown in FIG. 2, the digital data C is not illustrated, since the state that no DOWN-pulse signal S2 is inputted is shown. Every boxes in the diagrams of FIGS. 2 and 3 represent output periods of the data shown by letters, numerals or signs included therein. The digital output data D13 is inputted to a logic circuit 4. The logic circuit 4 will be elucidated in detail hereinafter.

In the frequency divider, a dividing ratio is set in a dividing ratio setting apparatus 5A. In the embodiment, the dividing ratio is represented by the ratio (M/N) of two arbitrary integers M and N.

First, the values of two integers M and N representing the dividing ratio are inputted with an input apparatus 5B (for example, key board) of the dividing ratio setting apparatus 5A. In the dividing ratio setting apparatus 5A, the following digital data D1, D2, D3, D4, D5 and D6 are generated:
 data D1: denominator data (N),
 data D2: negative denominator data ($-N$),
 data D3: numerator data (M),
 data D4: D3+D1 (M+N),
 data D5: D3−D1 (M−N), and
 data D6: data of zero (0),
where, $D1 \geq D3$ (i.e. $N \geq M$).

The data D1, D3, D4, D5 and D6 are inputted to a data selector 5, and the data D1 and D2 are inputted to a digital comparator 3. Register output data D9 which is output from a register 7 is also inputted to the digital comparator 3, and the three data D1, D2 and D9 are compared in the digital comparator 3. The register output data D9 is what the output data D8 of a calculation circuit 6 is latched by the register 7, namely, the output data D8 is output as the register output data D9 in synchronism with the clock pulse S12. Therefore, the content of the register output data D9 is identical with that of the output data D8.

Conditions of comparison in the digital comparator 3 are represented by three inequalities, and when either one of these conditions of the inequalities is satisfied, data "D", "E" or "F" representing each condition is output as "comparison resultant data D15". Three inequalities of the conditions corresponding to the data D, E and F are shown as follows:

for data D: data $D1 \leq$ data D9   (1), for data E: data $D2 \geq$ data D9   (2), and for data F: data $D2 <$ data $D9 <$ data D1   (3).

The comparison-resultant data D15 output from the digital comparator 3, namely the data D, E or F is inputted to the logic circuit 4.

In the logic circuit 4, a predetermined logical operation is performed on the basis of the digital output data D13, which is inputted from the pulse input circuit 1, and the comparison resultant data D15; and "selection data D16" for selecting one of data D1, D3, D4, D5 and D6 is given to the data selector 5. The selection data D16 is generated in the logic circuit 4 on the basis of the conditions shown in a first and a second columns of Table 1.

TABLE 1

| | Condition | | Operation | | |
|---|---|---|---|---|---|
| Row number | Digital output data (D13) | Comparison resultant data (D15) | Data selector output data (D7) | Calculation instruction data (D21) | Output instruction data (D19) |
| 1 | input of UP-pulse (A) | D1≦D9 (D) | D5 | + | Output of UP-signal (U) |
| 2 | Input of UP-pulse (A) | D2≧D9 (E) | D4 | + | Output of DOWN-signal (P) |
| 3 | Input of UP-pulse (A) | D2<D9<D1 (F) | D3 | + | NO output (Q) |
| 4 | NO input (B) | D1≦D9 (D) | D1 | − | Output of UP-signal (U) |
| 5 | NO input (B) | D2≧D9 (E) | D1 | + | Output of DOWN-signal (P) |
| 6 | NO input (B) | D2<D9<D1 (F) | D6 | +or− | NO output (Q) |
| 7 | Input of DOWN-pulse (C) | D1≦D9 (D) | D4 | − | Output of UP-signal (U) |
| 8 | Input of DOWN-pulse (C) | D2≧D9 (E) | D5 | − | Output of DOWN-signal (P) |
| 9 | Input of DOWN-pusle (F) | D2<D9<D1 | D3 | − | NO output (Q) |

TABLE 1-continued

| | Condition | | Operation | | |
|---|---|---|---|---|---|
| Row number | Digital output data (D13) | Comparison resultant data (D15) | Data selector output data (D7) | Calculation instruction data (D21) | Output instruction data (D19) |
| | (C) | | | | |
| | 1 | 2 | 3 | 4 | 5 |
| | | Column number | | | |

Referring to the Table 1, the selection data D16 for selecting data shown in a third column is output on the basis of the digital output data D13 in the first column and the comparison resultant data D16 in the second column in the same row representing a "condition" of operation in the Table 1. The selection data D16 is a command data for selecting the data shown in the third column of the same row from among the data D1, D3, D4, D5 and D6 which are inputted to the data selector 5. The selected data is output from the data selector 5 as "data selector output data D7". The content of the data selector output data D7 is one of the data D1, D3, D4, D5 and D6. The data selector output data D7 is applied to the calculation circuit 6.

On the other hand, in the logic circuit 4, a "calculation instruction data D12" for instructing addition (+) or subtraction (−) which is shown in a fourth column of the Table 1 is predetermined in accordance with a combination in the same row of the digital output data D13 in the first column and the comparison resultant data D15 in the second column. Therefore, when the combination of the digital output data D13 and comparison resultant data D15 is decided in a row, in other words when the row number is decided, a calculation instruction data D21 corresponding to the combination is transmitted from the logic circuit 4 to the calculation circuit 6.

In the calculation circuit 6, adding operation or subtracting operation between the data selector output data D7 and the register output data D9 is carried out in compliance with equation (4) or (5) as follow:

$$(\text{data D9}) + (\text{data D7}) = (\text{data D8}) \quad (4),$$

$$(\text{data D9}) - (\text{data D7}) = (\text{data D8}) \quad (5).$$

Resultant output data D8 of the calculation circuit 6 is applied to the register 7 and is latched. The latched output data D8 is output from the register 7 as the register output data D9 in synchronism with the clock pulse S12.

Hereafter, operation of the frequency divider is elucidated with reference to the timing chart of FIG. 2. Referring to FIG. 2, the clock signal S13 is a square wave signal having 50% of duty ratio, for example, the frequency is higher than the maximum frequency of the output signals of the rotary encoder. In the embodiment, whole the circuits are operated on the basis of the clock pulse S12 which is a rise edge pulse signal of the clock signal S13. The UP-pulse signal S1 and DOWN-pulse signal S2 are the output signals of the rotary sensor 1A, and in FIG. 2, input of the UP-pulse signal S1 (normal rotation) is illustrated.

Since the UP-pulse signal S1 is inputted at a time T2, the data A representing input of the UP-pulse signal S1 is output for the digital output data D13 in synchronism with the clock pulse S12. The data A is maintained during one period of the clock pulse S12, and thereafter there is output the data B representing neither UP-pulse signal S1 nor DOWN-pulse signal S2.

For example, when the value of the numerator data D3 is "3" (M=3), and the value of the denominator data D1 is "4" (N=4), the data in the dividing ratio setting apparatus 5A are represented by:

$$\left. \begin{array}{l} \text{data D1} = \phantom{-}4 \\ \text{data D2} = -4 \\ \text{data D3} = \phantom{-}3 \\ \text{data D4} = \phantom{-}3 + 4 = \phantom{-}7 \\ \text{data D5} = \phantom{-}3 - 4 = -1 \\ \text{data D6} = \phantom{-}0 \end{array} \right\} \quad (6).$$

In initial state of the circuit of the frequency divider, the output data D9 output from the register 7 is set to "0".

Before a time T1 of the clock pulse signal S12, the digital output data D13 is the data B (no input), and the comparison resultant data D15 of the digital comparator 3 is the data F, because three data D1, D2 and D9 are in the relation shown by the inequality (3), which is data D2 (=−4) < data D9 (=0) < data D1 (=4).

Consequently, the condition of a sixth row is selected in the Table 1, and output data D7 of the data selector 5 is data D6 (=0). Since the calculation instruction data D21 is "+ or −" as shown in the sixth row of the Table 1, the calculation in the calculation circuit 6 is as follow:

$$\text{data D9} (=0) \pm \text{data D7} (=0) = \text{data D8} (=0).$$

Consequently, the calculation circuit output data D8 is "0", and the data is stored in the register 7. The data "0" stored in the register 7 is output as the register output data D9 at the successive clock pulse S12, and thus, the register output data D9 maintains the value "0".

Since the rotary sensor 1A is in normal rotation, a first UP-pulse signal S1 is inputted to the pulse input circuit 1 at a time T2. Consequently, the digital output data D13 turns to the data A at a time T3 of the clock pulse S12.

In the digital comparator 3, the denominator data D1 (=4), negative denominator data D2 (=−4) and register output data D9 (=0) are compared with each other, and it is determined that comparison result is represented by the inequality (3). Then as shown in the third row in the Table 1, the data F of the comparison resultant data D15 is applied to the logic circuit 4. Consequently, the calculation instruction data D21 is "+" (addition), and the logic circuit 4 issues the selection data D16 for selecting the numerator data D3 (=3) to the data selector 5. Thus, the numerator data D3 (=3) is output from the data selector 5 and is applied to the calculation circuit 6.

Since the calculation instruction data D21 which is given to the calculation circuit 6 is "+", adding operation is carried out in compliance with the equation (4) as follows:

0 (output data D9) + 3 (numerator data D3) = 3.

Since the result of the addition is "3", the value of the calculation circuit output data D8 is also "3", and stored in the register 7. The calculation circuit output data D8 in the register 7 is output as the register output data D9 at a time T4 of the clock pulse S12, and is applied to the digital comparator 3 and the calculation circuit 6. The data after the time T4 are as follows:

| | |
|---|---|
| digital output data D13 | "B" (no input), |
| comparison resultant data D15 | "F" (D2 < D8 < D1), |
| data selector output data D7 | "D6" (=0), |
| logic circuit output data D21 | "+ or −", and |
| data D9 | "3". |

A successive UP-pulse signal S1 is inputted at a time T5, and data A of the digital output data D13 is inputted to the logic circuit 4 at a time T6 of the clock pulse S12.

On the other hand in the digital comparator 3, the value of the register output data D9="3", the result of comparison of the denominator data D1 (=4), the negative denominator data D2 (=−4) and register output data D9 (=3) is represented by the inequality of "D2<D9<D1" (−4<3<4). And therefore, the comparison resultant data D15 becomes the data F. Consequently, as shown in the third row of the Table 1, the calculation instruction data D21 is "+" and the data selector output data D7 of the data selector 5 becomes the numerator data D3 (=3).

Subsequently, in the calculation circuit 6, the data selector output data D7 (=3) is added to the register output data D9 (=3), and the sum "6" is output as the calculation circuit output data D8, and is latched by the register 7. The calculation circuit output data D8 (=6) is output as the register output data D9 at a time T7 of the clock pulse S12. Thereafter the similar operation as mentioned above is proceeded.

Subsequently, an "output instruction data D19" in the Table 1 is elucidated. The output instruction data D19 is output from the logic circuit 4 and is applied to a pulse output circuit 2. The output instruction data D19 corresponds to the comparison resultant data D15. In compliance with the data D, E or F of the comparison resultant data D15 inputted to the logic circuit 4, the output instruction data D19 in the rows corresponding to the data D, E or F in a fifth column of the Table 1 is output from the logic circuit 4. The output instruction data D19 has data U, P or Q, and the respective output indication functions of the data U, P and Q are as follows:

data U: an UP-output signal is output,
data P: a DOWN-output signal is output, and
data Q: both the UP-output signal and DOWN-output signals are not output.

The output instruction data D19 is inputted to the pulse output circuit 2, and the UP-output signal S7 or the DOWN-output signal S8 are output in synchronism with the clock pulse S12. In the above-mentioned example, the data of the digital output data D13 and the comparison resultant data D15 at the time T6 correspond to the data which are shown in the third row of the Table 1, and the output instruction data D19 is "Q". Consequently, no output is output from the pulse output circuit 2. Therefore, the UP-output signal S7 corresponding to the UP-pulse signal S1 inputted at the time T2 is not output. A waveform S7-0 which is illustrated with a dotted line at the time T6 on the diagram of the UP-output signal S7 represents a signal which corresponds to the UP-pulse signal S1 and is not output by the dividing operation of the frequency divider.

Subsequently, at the time T7 the data of condition are as follows:

| | |
|---|---|
| digital output data D13 | "B", |
| comparison resultant data D15 | "D" |
| (D1 (=4) ≦ D9 (=6)), and | | the combination of both the data B and D meets the condition in the fourth row of the Table 1.

Consequently, the respective data are as follows:

| | |
|---|---|
| data selector output data D7 | "D1 (=4)", |
| calculation instruction data D21 | "−", and |
| output instruction data D19 | "U". |

Moreover the calculation circuit output data D8 is "2" (6−4=2). Since the output instruction data D19 is "U", an UP-output signal S7-1 is output at a time T9.

After the time T7 of the clock pulse S12, the UP-pulse signal S1 is inputted at a time T8, and therefore the respective data at the time T9 are as follows:

| | |
|---|---|
| digital output data D13 | "A", and |
| comparison resultant data D15 | "F" (−4<2<4). |

The combination of the above-mentioned data A and F meets the condition in the third row of the Table 1, and the data of operation of Table 1 are as follows:

| | |
|---|---|
| data selector output data D7 | "D3 (=3)", and |
| calculation instruction data D21 | "+". |

Consequently, the output instruction data D19 is "Q", and an UP-output signal is not output at a time T10 of the clock pulse S12. The output data D8 of the calculation circuit 6 becomes "5" (2+3=5), and the register output data D9 becomes "5" at the time T10.

At the time T10, the data of condition in the Table 1 are as follows:

| | |
|---|---|
| digital output data D13 | "B", and |
| comparison resultant data D15 | "D" (4 < 5). |

The combination of the data B and D meets the condition in the fourth row of the Table 1. Therefore, the respective data are as follows:

| | |
|---|---|
| data selector output data D7 | "D1" (=4), |
| calculation instruction data D21 | "−", |
| output instruction data D19 | "U", and |
| output data D9 | "1" (5−4=1). |

Consequently, the output data D8 of the calculation circuit 6 becomes "2" (0+2=2). Since the output instruction data D19 becomes "U", an UP-output signal S7-2 corresponding to the UP-pulse signal S1 inputted at the time T8 is output at a time T12.

Prior to the time T12 the UP-pulse signal S1 has been inputted at a time T11, and the respective data at the time T12 becomes as follows:

| digital output data D13 | "A", and |
| --- | --- |
| comparison resultant data D15 | "F" (−4<1<4). |

Consequently, the combination of the above-mentioned data A and F meets the condition of the third row of the Table 1. Therefore, the data in operation are as follows:

| data selector output D7 | "D3 (=3)", |
| --- | --- |
| calculation instruction data D21 | "+", and |
| output instruction data D19 | "Q". |

Thus an output signal S7 is not output at a time T13. Then the calculation circuit output data D8 becomes "4" (1+3=4).

Moreover, the respective data at a time T13 are as follows:

| digital output data D13 | "B", and |
| --- | --- |
| comparison resultant data D15 | "D" (4≦4). |

Therefore, the combination of the above-mentioned data B and D meets the condition shown in the fourth row of the Table 1. Consequently, the respective data in operation are as follows:

| data selector output data D7 | "D1 (=4)" |
| --- | --- |
| calculation instruction data D21 | "−", |
| output instruction data D19 | "U", and |
| output data D8 | "0" (4−4=0). |

Since the output instruction data D19 is "U", an UP-output signal S7-3 is output at a time T15.

Prior to the time T15, the UP-pulse signal S1 has inputted at a time T14, and the data of condition at the time T15 are as follows:

| digital output data D13 | "A", and |
| --- | --- |
| comparison resultant data D15 | "F" (−4<0<4). |

The combination of the above-mentioned data A and F meets the third row of the Table 1.

Therefore, the data in operation are as follows:

| data selector output D7 | "D3 (=3)", |
| --- | --- |
| calculation instruction data D21 | "+", and |
| output instruction data D19 | "Q". |

Therefore, an UP-output signal S7 is not output at a time T16.

When an UP-pulse signal S1 is inputted at a time T17, the data of condition at a time T18 are as follows:

| digital output data D13 | "A", and |
| --- | --- |
| comparison resultant data D15 | "F" (−4<3<4). |

The combination of the above-mentioned data meets the condition of the third row of the Table 1. Therefore, the data of operation are as follows:

| data selector output D7 | "D3 (=3)", |
| --- | --- |
| calculation instruction data D21 | "+", and |
| output instruction data D19 | "Q". |

Therefore, the UP-output signal S7 is not output.

After the above-mentioned operation the output data D9 becomes "6" (3+3=6).

The data of condition at a time T19 are as follows:

| digital output data D13 | "B", and |
| --- | --- |
| comparison resultant data D15 | "D" (4≦6). |

Consequently, the combination of both the data meets the condition of the fourth row of the Table 1. Therefore, the data of operation are as follows:

| data selector output D7 | "D1 (−4)", |
| --- | --- |
| calculation instruction data D21 | "−", and |
| output instruction data D19 | "U". |

Consequently, an UP-output signal S7-5 is output at a time T21. At this time the calculation circuit output data D8 becomes "5" (2+3=5).

In a similar manner, the UP-pulse signal S1 which has been inputted at a time T20 is output as an UP-output signal S7-6 at a time T24.

According to the present embodiment of the frequency divider as mentioned above, one of four UP-pulse signals S1 which are inputted to the pulse input circuit 1 is lost and is not output to the UP-output signal S7. UP-output signals S7-0 and S7-4 illustrated by a dotted line in the diagram of the UP-output signal S7 represent these lost UP-output signal S7. Consequently, the frequency of the UP-output signal S7 becomes three fourth of that of the UP-pulse signal S1, and thus the dividing ratio in this case is three fourth (¾). In the embodiment, the dividing ratio is represented by the ratio "M/N" of the integers M and N. Arbitrary integers can be set to the values of M and N, and hence the frequency divider having a desired dividing ratio is realizable.

FIG. 3 is a timing chart of the operation in the case that the rotating direction of the rotary sensor 1A is changed from the normal rotation to the reverse rotation between a times T6 and T8. Operation of every circuits of the frequency divider is similar to those as mentioned above, and the detailed description is omitted. In the example shown in FIG. 3, the period of the UP-pulse signal S1 and DOWN-pulse signal S2 are close to the period of the clock pulse S12, the frequency divider in accordance with the present invention functions accurately in such a case. (In actual operation, the period of the clock pulse S12 is selected to be shorter than the period of the UP-pulse signal S1 and DOWN-pulse signal S2, therefore there is no probability to reach the status shown in FIG. 3).

In general, when the rotating direction of the rotary sensor 1A is changed, the rotating speed is gradually decreased and is once stopped. After then it starts rotation in the reverse direction. In the example shown in FIG. 3, in order to preserve the clarity of the drawing, the rotation is suddenly changed from a high speed normal rotation to a high speed reverse rotation. In the above-mentioned case, output signals illustrated by a dotted line on the diagram of the DOWN-output signal S8 in FIG. 3 are lost, and the DOWN-pulse signal S2 is divided on the basis of the dividing ratio represented by the ratio "M/N" of the arbitrary two integers M and N.

In the above-mentioned embodiment, though each of clock pulse S12 is generated at each rise edge of the clock signal S13, it may be generated at a fall edge of the clock signal S13. In FIGS. 2 and 3, the comparison resultant data D15, selection data D16, data selector output data D7, calculation instruction data D21, calculation circuit data D8 and output instruction data D19 change with a time-lag with respect to the clock pulse S12. The time-lag is caused by an operation time in the digital circuit which is well known in the art. The frequency divider in accordance with a present invention is applicable to a general pulse signal as well as the output signal of the rotary sensor 1A.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A frequency divider comprising:
    clock signal generating means for generating a clock pulse signal of a predetermined period,
    a pulse input circuit comprising memory means for storing an input pulse signal and a first logic circuit for generating a predetermined digital data based on said input pulse signal, and outputting respective digital data corresponding to presence or absence of said input pulse signal in synchronism with said clock pulse signal,
    an input apparatus for setting numerator data (M) and denominator data (N) for designating a dividing ratio (M/N),
    a dividing ratio setting apparatus for generating respective digital data representing said numerator data (M), said denominator data (N), negative denominator data (−N), data of sum of said denominator data (M) and numerator data (N), data of difference subtracted said denominator data (N) from said numerator data (M) and data of zero on the basis of said denominator data (M) and said numerator data (N) inputted from said input apparatus,
    memory means for storing output data of a calculation circuit, and outputting said stored data in synchronism with said clock signal,
    a digital comparator for comparing output data of said memory means, said denominator data (N) and said negative denominator data (−N), and for outputting comparison resultant data corresponding to one of a predetermined number of comparison conditions,
    a second logic circuit for outputting:
        selection data for selecting one data from among said digital data generated by said dividing ratio setting apparatus,
        calculation instruction data for instructing either one of addition operation, subtraction operation and addition-or-subtraction operation, and
        output instruction data for instructing output or interception of an output signal corresponding to said input pulse signal, and said selection data, calculation instruction data and output instruction data are predetermined in correspondence to combinations of said digital data representing presence or absence of said input pulse signal and said comparison resultant data,
    a data selector for selecting one digital data designated by said selection data given from said second logic circuit from among said digital data inputted from said dividing ratio setting apparatus,
    a calculation circuit for applying calculation based on said calculation instruction data inputted from said second logic circuit to said digital data output from said data selector and output data of said memory means for storing said output data, and inputting resultant output data to said memory means, and
    a pulse output circuit for outputting an output pulse signal in compliance with said output instruction data output from said second logic circuit.

2. A frequency divider in accordance with claim 1, wherein
    two input signals of two lines are inputted to said pulse input circuit, and said pulse output circuit outputs a divided pulse signal corresponding to said input pulse signal of each line.

* * * * *